United States Patent [19]

Yamamoto et al.

[11] Patent Number: 5,114,641

[45] Date of Patent: * May 19, 1992

[54] METHOD FOR PRODUCING AN ELONGATED SINTERED ARTICLE

[75] Inventors: Susumu Yamamoto; Teruyuki Murai; Nozomu Kawabe; Masaaki Tobioka, all of Hyogo, Japan

[73] Assignee: Sumitomo Electric Industries, Ltd., Osaka, Japan

[ * ] Notice: The portion of the term of this patent subsequent to Apr. 9, 2008 has been disclaimed.

[21] Appl. No.: 606,850

[22] Filed: Oct. 31, 1990

Related U.S. Application Data

[63] Continuation of Ser. No. 63,228, Jun. 17, 1987, Pat. No. 5,006,289.

[30] Foreign Application Priority Data

| Jun. 17, 1986 | [JP] | Japan | 61-141566 |
| Aug. 13, 1986 | [JP] | Japan | 61-190891 |
| Sep. 10, 1986 | [JP] | Japan | 61-214487 |
| Oct. 17, 1986 | [JP] | Japan | 61-246937 |
| Dec. 5, 1986 | [JP] | Japan | 61-291216 |
| Dec. 26, 1986 | [JP] | Japan | 61-312958 |
| Jan. 9, 1987 | [JP] | Japan | 62-3060 |

[51] Int. Cl.$^5$ .............................. C04G 33/34
[52] U.S. Cl. ....................... 264/60; 264/61; 264/125; 264/332
[58] Field of Search ............. 264/125, 60, 61, 332

[56] References Cited

U.S. PATENT DOCUMENTS

| 3,409,973 | 11/1968 | Kilp et al. | 29/420 |
| 3,429,025 | 2/1969 | Baily et al. | 29/420.5 |
| 3,932,315 | 1/1976 | Sleight | 252/521 |
| 4,050,147 | 9/1977 | Winter et al. | 29/599 |
| 4,478,787 | 10/1984 | Nadkarni et al. | 419/8 |
| 4,642,218 | 2/1987 | Rice | 419/11 |
| 4,826,808 | 5/1989 | Yurek et al. | 505/1 |
| 4,952,554 | 8/1990 | Jin et al. | 505/1 |
| 5,006,289 | 4/1991 | Yamamoto et al. | 419/26 |

FOREIGN PATENT DOCUMENTS 60-173885 9/1985 Japan .
61-131307 6/1986 Japan .
981065 1/1965 United Kingdom .

OTHER PUBLICATIONS

"Critical Current Density of Wire Type Y–Ba–Cu Oxide Superconductor", Yamada et al, *Journal of Applied Physics*, vol. 26, No. 5, May 1987, pp. L865–L866.

"High $T_c$ Superconductors-Composite Wire Fabrication", S. Jin et al, *Appl. Phys. Lett.*, 51 (3), Jul. 20, 1987 pp. 203–204.

Asahi Newspaper, Masumoto et al, Mar. 10, 1987.

"Bulk and Wire Type Y–Ba–Cu Oxide Superconductor", Yamada et al, Int. Conference on Low Temperature Physics, Kyoto, 1987 Japanese Journal of Applied Physics, vol. 26 (1987).

"Microstructural and Electromagnetic Characterization", D. C. Larbalestier et al, Applied Superconductivity Center and Department of Metallurgical and Mineral Engineering, University of Wisconsin, Madison, Wis. Mar. 18, 1987.

"Possible Hight $T_c$ Superconductivity in the Ba–La–Cu–O System" J. G. Bednorz and K. A. Muller, IBM Zurich Research Laboratory, Ruschukon, Switzerland, Z. Phys. B-Condensed Matter 64, 189–193 (1986).

"An Epoch-Making Superconducting Material", Yomiuri Shimbun, (Chu article), Feb. 16, 1987, Kyodo, Japan.

*Primary Examiner*—Stephen J. Lechert, Jr.
*Attorney, Agent, or Firm*—Kerkam, Stowell, Kondracki & Clarke

[57] ABSTRACT

Method for producing an elongated sintered article, characterized by the steps including filling powder material in a pipe, carrying out plastic deformation of the pipe filled with the powder material, and heating the pipe filled with the powder material to burn and/or sinter the powder material.

The method of the present invention is advantageously applicable to production of wire or rod of ceramics, particularly so called new ceramics or fine ceramics, sintered alloys or their combination, which are difficult of shaping or moulding by conventional process such as wire-drawings, rolling or extrusion of powder material and are difficult of machining or processing after the powder material is sintered.

28 Claims, 6 Drawing Sheets

METHOD FOR PRODUCING AN ELONGATED SINTERED ARTICLE

This is a Continuation of application Ser. No. 063,228, filed Jun. 17, 1987 U.S. Pat. No. 5,006,289.

BACKGROUND OF THE INVENTION

1. Field of the Invention

The present invention relates to a novel method for producing an elongated sintered article, particularly relates to a method for producing elongated sintered articles in a form of wire, strand, tape, sheet, rod or the like from powder materials.

The method of the present invention is advantageously applicable to production of wire or rod of ceramics, particularly so called new ceramics or fine ceramics, sintered alloys or their combination, which are difficult of shaping or moulding by conventional process such as wiredrawing, rolling or extrusion of powder material and are difficult of machining or processing after the powder material is sintered.

2. Description of the Related Art

Since new ceramics or fine ceramics and sintered alloys show a wide variety of functions, their application is spreading over a variety of industrial fields. These new or fine ceramics and sintered alloys are utilized in machine parts due to their higher hardness, heat-resistance and dimensional stability, in optical parts due to their high transparency or unique electromagnetic functions, in biological or chemical field such as artificial bone or catalyst because of their superior histocompatibility or chemical-resistance, in electronics or electric parts owing to their improved or unique properties such as electroconductivity or insulative property, and so on.

The term of ceramics and sintered alloys imply any sintered article made by sintering process of inorganic powder material and/or metal powder material. Ceramics are classified into two types of oxide-type and nonoxide type. The oxide type ceramics are divided into simple oxides such as alumina ($Al_2O_3$), zirconia ($ZrO_2$), beryllia (BeO) etc. and compound oxides such as ferrites ($MO.Fe_2O_3$), PLZT (($Pb,La$)($Zr,Ti$)$O_3$) or the like. In the nonoxide type ceramics, we can mention a variety of compounds such as nitrides such as $Si_3N_4$, AlN, carbide such as SiC, WC, boron carbide ($B_4C$), partially stabilized zirconia etc. Sintered alloys such as carbide precipitating type cobalt-based alloy are made mainly of transition metals but are also called as a kind of ceramics.

Ceramics such as tungstencarbide and so called cemented carbides in which carbides of transition metals are bonded with a binder metal such as cobalt show higher hardness and superior tenacity and hence are widely used in a variety of applications such as cutting tools, abrasion resisting parts or the like. It has become more popular to use twistdrills made of this ceramics in the field of the cutting tool and printer head rods for dot-matriprinters as a abrasion resisting part.

Ceramics such as tungstencarbide, alumina or the like posses extremely higher hardness and higher abrasion resistance and are attracting wide public interest. They are used widely in a variety of industries as a ceramic shaft, a ceramic reed or the like.

Ceramics such as siliconcarbide, alumina or the like posses higher strength at high temperatures and improved abrasion resistance and hence are widely used in a variety of applications such as parts which are used at a higher temperature range. Particularly, demand for ceramics parts having an elongated rod-like shape is much increasing in the field of a shaft for engine parts, conveyer rollers which are used at high temperatures, electrodes for automatic welding machines or the like.

Recently, alumina is widely used in the field of electronics as packaging material or substrates or the like.

Carbide precipitating reinforced type cobalt-based alloy consists of 20 to 35 wt % of Cr, 3 to 20 wt % of W, 0.5 to 3 wt % of C and balance of Co and have superior heat-resistance, corrosion-resistance and abrasion-resistance and hence is usually used under high-temperature or corrosive atmosphere. Recently, the carbide precipitating reinforced type cobalt-based alloy has been used in the field of shafts of jet-engines, electrodes for welder, jet-spraying rod etc. and hence demand for elongated wire or elongated rods (hereinafter referred as fine wire) is increasing.

Although ceramics or sintered alloys are used in every industrial field, machining or processing of the sintered body is very difficult to perform because one of their important properties is their harness. That is, sintered body can not be machined or shaped by ordinary cutting tools and so they have been machined only by electro spark machining or diamond cutting techniques. Still more, powder material for these ceramics and sintered alloys are difficult to be shaped or moulded into an elongated article by conventional techniques such as extrusion, rolling or wire-drawing.

Therefore, heretofore, when an elongated article is produced, the powder material is moulded or shaped into an elongated configuration and then sintered in order to minimize after-treatment or after-processing of the sintered article. In this method, it is difficult to produce an elongated article of high quality.

In another technique for producing a rod such as a shaft, a block or billet is preformed by a press and then is machined by cutting into the final shape. This process, however, has not high productivity as well as produce very large amount of loss of expensive powder material. In this process, it is also impossible to produce a long wire or rod because the ratio of longitudinal dimension to cross sectional dimension can not be increased and continuous operation can not be adopted.

In still another prior art, a mixture of powder material and binder of organic compound is extruded into an elongated article or coated onto a supporting belt, and after the organic binder is eliminated in a preliminary sintering stage, final sintering is carried out. It is very difficult in practice to remove the organic binder completely during the preliminary or intermediate sintering step because a large volume of organic binder is added to the powder material and hence a part of carbon remain in the final sintered product, resulting in cause of defects such as cavities or voids which will lower the strength of the final sintered products or deteriorate characteristics of the sintered product whose contents of carbon must be controlled precisely. Still more, it takes long time such as several hours to perform the preliminary sintering for removal of carbon, resulting in lowering productivity.

Therefore, it has been very difficult to produce an elongated article of high quality from powder materials for ceramics.

In case of carbide precipitating type cobalt-based alloy, there are several other techniques which can be applicable to produce an elongated article such as (1)

centrifugal Casting, (2) Rotary Spinning in water and (3) metal plating. However, (1) Although centrifugal casting process is one of rather easier techniques, it is difficult to produce elongated fine articles. The maximum length of the fine wire produced by this technique was about 20 to 30 cm in case of a diameter of 2 mm. There is problem of defects such as cavity which is apt to be produced at the center of the fine wire and microsegregation due to casting operation, resulting in that it is difficult to produce a fine wire having a high quality in strength.

(2) The rotary spinning in water can produce fine elongated wire products but it is very difficult to adjust or control its diameter. Still more, the diameter of the wire is limited to less than 1 mm.

(3) In the metal plating, a carbon fiber is coated with a plating layer of Co, W, Cr or the like which is then diffused to produce an alloy. However, the plating of W is extremely difficult to practice and productivity is also low.

Therefore, there still remain problems to be solved in this field of technology. Particularly, a novel process which is practicable in the field of wire manufacturing or rod manufacturing is strongly requested.

Accordingly, an object of the present invention is to provide a novel method for producing an elongated sintered article of higher quality with the higher productivity and with reduced loss of expensive powder material.

SUMMARY OF THE INVENTION

According to the present invention, method for producing an elongated sintered article is characterized by the steps including filling powder material in a pipe, carrying out plastic deformation of the pipe filled with the powder material, and heating the pipe filled with the powder material to burn and/or sinter the powder material.

In a preferred embodiment, the pipe is made of metal, the metal may be made of at least one of metals selected from a group consisting of Fe, Cu, Ni and Co and alloys containing the same. The term of "pipe" implies any kind of elongated hollow bodies, such as pipe, tube or cylinder. The cross section of the pipe is not limited to a circle but can be any other polygonal shape such as rectangular.

The powder materials to which the present invention is applicable may be any kind of powder material including metal powder which is difficult of moulding and machining, hard metal or cemented carbide, carbide precipitating reinforced cobalt-based alloy and a variety of ceramics powder. According to the present invention, the powder material does no contain binder of organic compounds.

According to the preferred embodiment, the powder material can be pelletized before the powder material is filled in the pipe. It is also preferable to seal at least one of ends of the pipe before the step of plastic deformation of the pipe filled with the powder material and before the step of burning and/or sintering.

The plastic deformation is preferably performed by wire-drawing or rolling. And it is also preferable to perform annealing or tempering of the pipe filled with the powder material in the stage of plastic deformation of the pipe filled with the powder material, and preferably the plastic deformation is carried out in a temperature range in which the powder material is not sintered. The heating temperature in the plastic deformation stage is preferably 10° to 100° C. lower than the sintering temperature of powder material. Therefore, preferably the pipe filled with the powder material is heated at a temperature which is higher than the anneal temperature or tempering temperature, in the plastic deformation stage.

The wire-drawing may be carried out by means of any one of die, roller die, roller, swagging machine or extruder. It is also possible to repeat a plural times of the plastic deformation and also possible to use different kinds of the plastic deformation processes in the plastic deformation stage.

The burning and/or sintering step may include preliminary or intermediate sintering operation and the preliminary sintering is preferably performed at a temperature which is from 10° to 100° C. lower than the melting point of the powder material.

According to another preferred embodiment, an elongated core body extending through the pipe can be placed in the pipe together with the powder material. This elongated core body is removed after the plastic deformation step or the burning and/or sintering step. Particularly, the elongated core body may be made of wood.

According to another embodiment of the present invention, at least a part of the plastic deformation step and at least a part of the burning and/or sintering step can be carried out simultaneously. Or it is also possible to perform the burning and/or sintering stage before or after the plastic deformation stage.

Finally, it is possible to remove the outer pipe from the final product. But, in special use such as a wire electrode for automated welding machines, it is preferable to leave the outer metal pipe or sheath on the sintered body without removing the metal pipe. The pipe may be removed after the plastic deformation stage or the burn and/or sintering stage. After the outer metal pipe is removed, the burnt and/or sintered body can be further heat-treated. In this case, the heat-treatment may be carried out at a temperature which is higher than the sintering temperature of the powder material.

The resulting product obtained by the process according to the present invention can have the longitudinal dimension of the final product which is more than 100 times longer than the cross sectional dimension.

According to the first preferred embodiment of the present invention, the method for producing an elongated article which is difficult of machining is characterized by filling powder material containing material or materials which are difficult of processing in a metal pipe, by extruding, rolling or wire-drawing the pipe filled with the powder above an annealing temperature of the metal pipe but below such a temperature at which the powder is sintered so that the metal pipe is shaped into the final configuration of the product, if necessary by repeating the shaping step, by sintering the shaped powder filled in the metal pipe, and then by removing the metal pipe.

According to the second preferred embodiment of the present invention, an elongated rod made of high-strength sintered cemented carbide is provided. This rod has a deflective strength of more than 350 Kg/mm$^2$ and the dimension of the rod along an elongated direction is more than 100 times longer than the cross sectional dimension thereof.

According to the second preferred embodiment of the present invention, the method for producing the high-strength elongated rod of sintered cemented carbide is characterized by filling powder material of cemented carbide in a pipe of metal, sealing the pipe, wire-drawing the sealed pipe filled with the powder at the dimension reduction ratio of more than 10% but less than 90%, carrying out a preliminary sintering of the sealed pipe at a temperature between 700° and 1200° C., removing the outer metallic pipe from an inner preliminarily sintered body, and then sintering the inner preliminarily sintered body at a temperature between 1280° and 1500° C.

In this embodiment, the pipe is made of at least one of metals of copper, nickel and cobalt or alloys including them as a base metal.

According to the third preferred embodiment of the present invention, the method for producing a composite which is difficult of machining is characterized by filling powder material containing material or materials which are difficult of processing in a metal pipe, by carrying out at least one of hot-workings comprising extruding, rolling or wire-drawing to give the pipe filled with the powder material to the final configuration of the product at a temperature which is higher than an annealing temperature of the metal pipe but is lower than the sintering temperature of the powder, and then by sintering the powder material in the metal pipe.

According to the fourth preferred embodiment of the prsent invention, the method for producing an elongated rod of ceramics is characterized by filling powder material of ceramics in a pipe of metal, by performing wire-drawing of the pipe filled with the powder material at the dimensional reduction ratio of more than 20% but less than 90%, by carrying out a preliminary sintering of the drawn pipe at a temperature between 1000° and 1300° C., removing the outer metallic body from a preliminarily sintered body, and then sintering the preliminarily sintered body at a temperature between 1600° and 2100° C.

In this embodiment, the pipe of metal is preferably made of metals of copper, nickel or cobalt or their alloys containing of at least one of the metals as a base metal.

According to the fifth preferred embodiment of the present invention, an elongated sintered hollow rod made of cemented carbide is provided. The rod has the longitudinal dimension which is more than 10 times longer than the cross sectional dimension and has a hole along the longitudinal direction. The deflective strength of the rod is more than 350 Kg/mm².

According to the fifth preferred embodiment of this invention, the method for producing the sintered elongated hollow rod of cemented carbide is characterized by placing an elongated core inside a pipe of metal along its axial direction, by filling powder material of cemented carbide containing no organic binder in an annular space between the pipe and the core, by performing wire-drawing of the pipe filled with the powder material at the dimensional reduction ratio of more than 10% but less than 90%, by carrying out a preliminary sintering of the drawn pipe at a temperature between 500° and 1200° C., removing both of the core and the outer metallic body from a preliminarily sintered hollow body, and then sintering the preliminarily sintered body at a temperature between 1280° and 1500° C.

In this embodiment, the elongated core is preferably made of wood and the pipe of metal is preferably made of copper, nickel or cobalt or one of alloys including at least one of these metals as a base metal.

According to the sixth preferred embodiment of the present invention, the method for producing a fine wire of cobalt-based alloy of carbide precipitating reinforced type is characterized by filling powder material of carbide precipitating reinforced type cobalt-based alloy in a pipe of copper, by performing wire-drawing of the copper pipe filled with the powder material at the dimensional reduction ratio of more than 20% but less than 90%, by carrying out a preliminary sintering of the drawn pipe at a temperature between 800° and 1000° C., removing the outer copper pope from a preliminarily sintered body, and then sintering the preliminarily sintered body at a temperature which is from 10° C. to 100° C. lower than the melting point of the alloy.

In this embodiment, the wire-drawing is preferably repeated and, before each wire-drawing, the pipe of copper which has been subjected to wire-drawing is annealed or tempered at least one time at a temperature of 400° to 700° C.

According to the seventh preferred embodiment of the present invention, the method for producing a fine wire of carbide precipitating reinforced type cobalt-based alloy is characterized by filling powder material of carbide precipitating reinforced type cobalt-based alloy in a pipe of cobalt, by performing wire-drawing of the cobalt pipe filled with the powder material at the dimensional reduction ratio of more than 20% but less than 90%, and then performing sintering at a temperature which is from 10° C. to 100° C. lower than the melting point of the alloy.

According to a variation of abovementioned seventh embodiment of the present invention, the method for producing a fine wire of carbide precipitating reinforced type cobalt-based alloy is characterized by filling powder material of carbide precipitating reinforced type cobalt-based alloy in a pipe of metal, by performing wire-drawing of the metal pipe filled with the powder material at the dimensional reduction ratio of more than 20% but less than 90%, and then performing sintering at a temperature which is from 10° C. to 100° C. lower than the melting point of the alloy and the pipe is preferably made of iron, nickel or cobalt.

Now, we will describe the present invention in more details by preferred embodiments of the present invention with reference to attached drawings, but the scope of the present invention should not be limited to the embodiments but must be understand from the definition of the claims.

DESCRIPTION OF THE PREFERRED EMBODIMENTS

Figure 1:
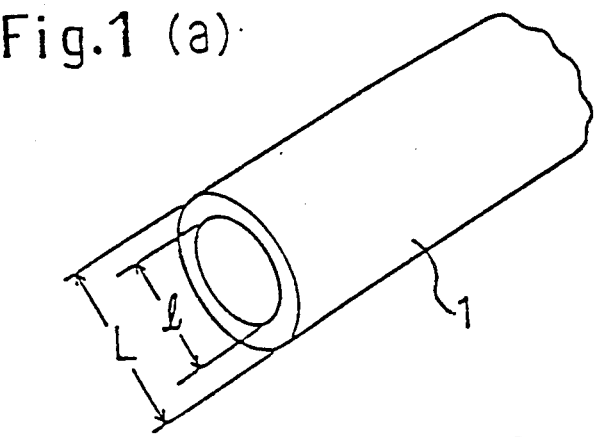
FIGS. 1 (a) to 1 (h) are an illustrative drawings showing successive steps of the process for producing an elongated article according to the present invention and FIGS. 1 (i) and 1 (j) are perspective views of the final products.
Figure 1:
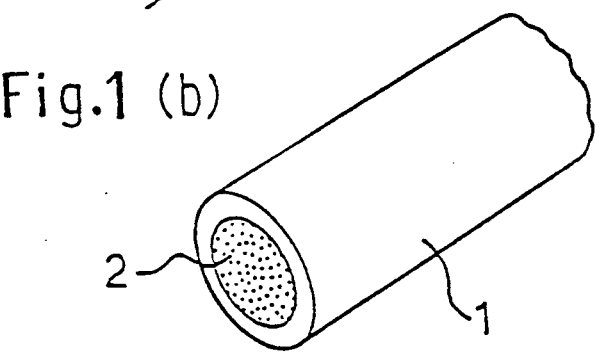
Figure 1:
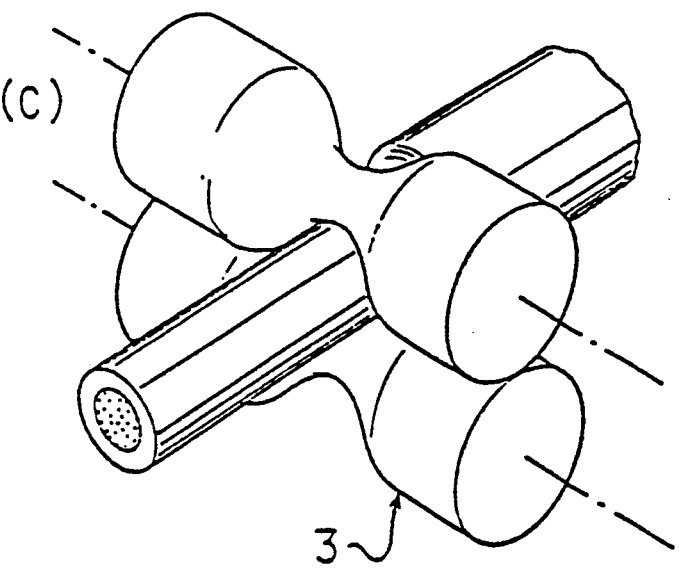
Figure 1D:
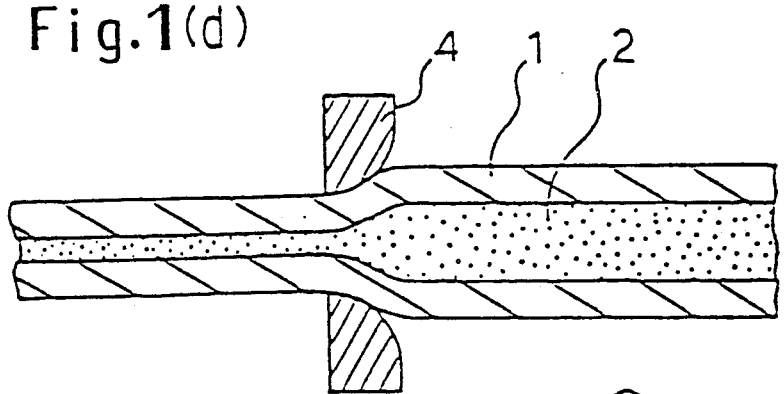
Figure 1E:
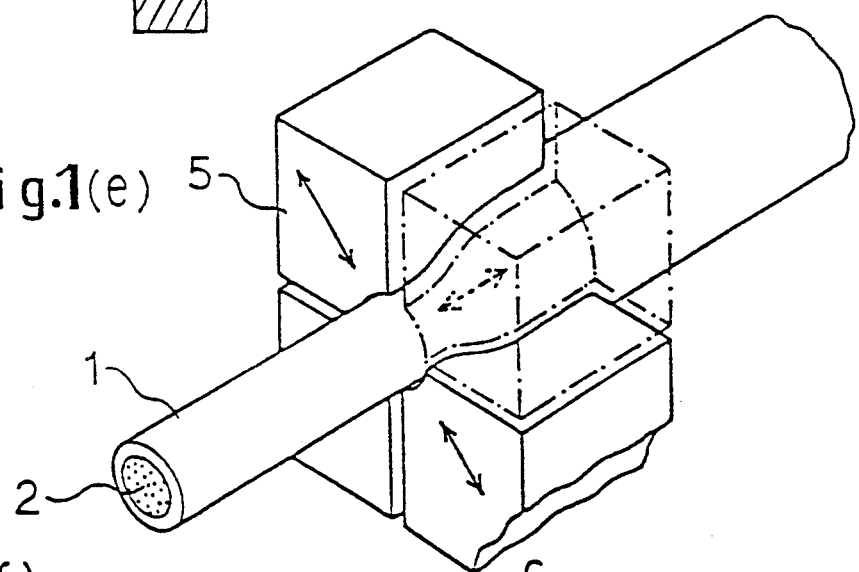
Figure 1F:
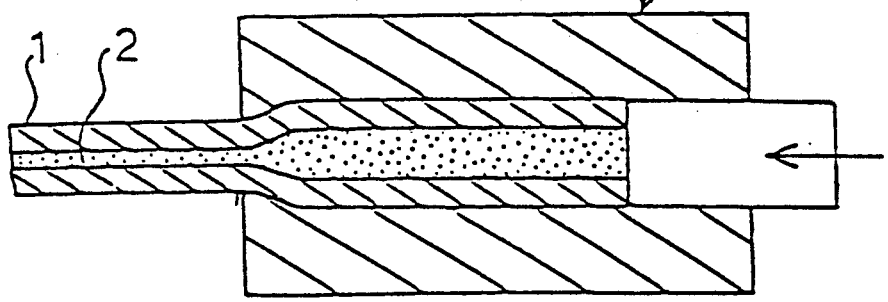
Figure 1G:
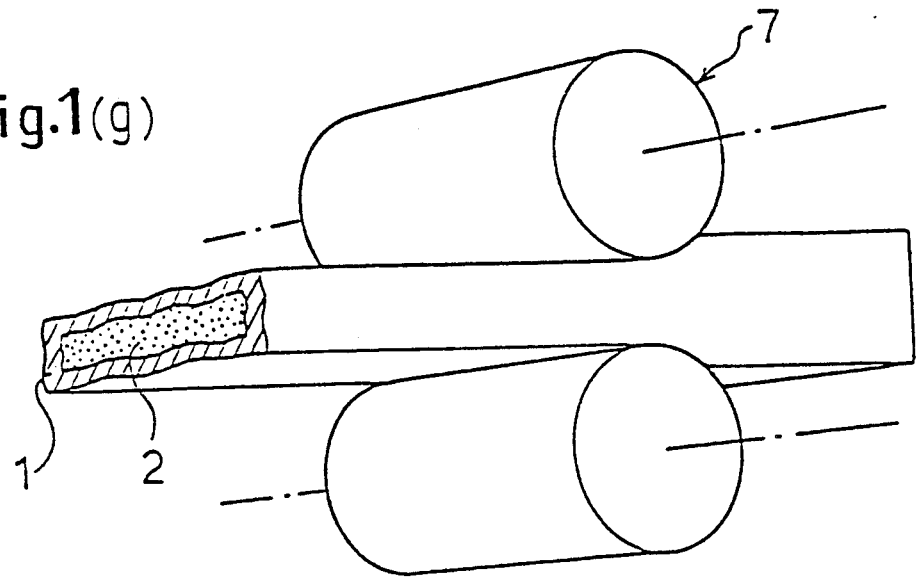
Figure 1H:
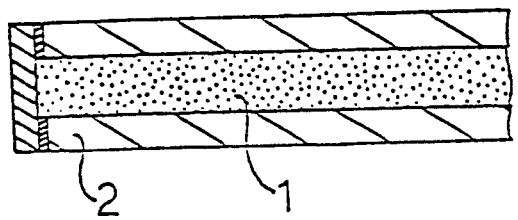
Figure 1I:
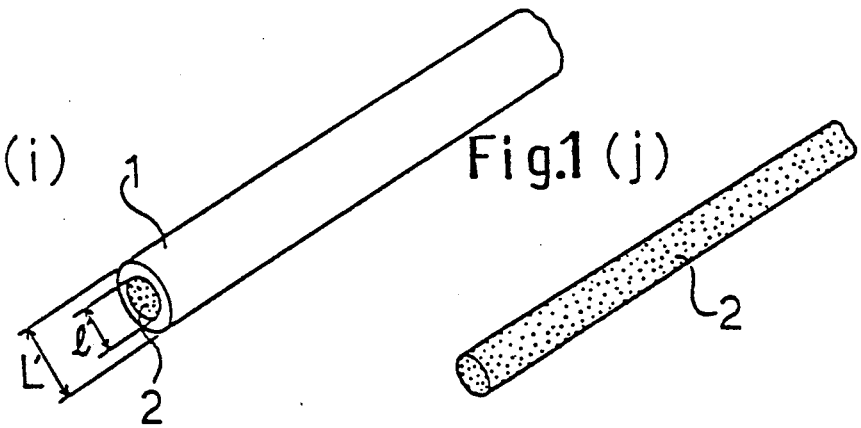
Figure 1J:
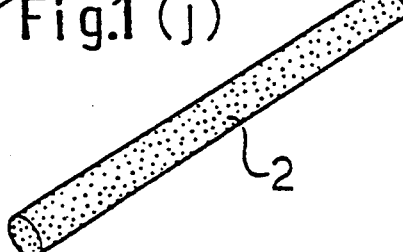

Referring to FIG. 1 (a), a pipe or sheath 1 has an outer diameter of L and an inner diameter of 1. Powder material 2 is filled or charged in the pipe 1 (FIG. 1 (b)).

Then, the pipe or sheath 2 in which the powder material is filled is subjected to wire-drawing. In FIG. 1 (c), the wire-drawing is performed by a pair of roller dies 3.

The wire-drawing can be carried out by passing the pipe 1 through one or plurality of die plates 4 shown in FIG. 1 (d). In the other embodiments, the wire-drawing can be performed by means of a swagging rollers 5 (FIG. 1 (e)) or an extruder 6 (FIG. 1 (f)). Still more, when the pipe has a rectangular cross section, the pipe can be laminated by means of rollers 7 (FIG. 1 (g)). At each operation of the wire-drawing, the metal pipe or sheath filled with powder material can be annealed or tempered so as to perform the wire-drawing smoothly. It is preferable to seal one or both ends of the pipe before the wire-drawing starts to prevent powder material from escaping, as is shown in FIG. 1 (h).

FIGS. 1 (i) and 1 (j) show two types of the product manufactured according to the process of the present invention. A product of a wire or rod shown in FIG. 1 (i) has the outer layer of the pipe or sheath 1 on the inner sintered body 2, while another product shown in FIG. 1 (h) has not the outer layer which is removed.

Figure 2:
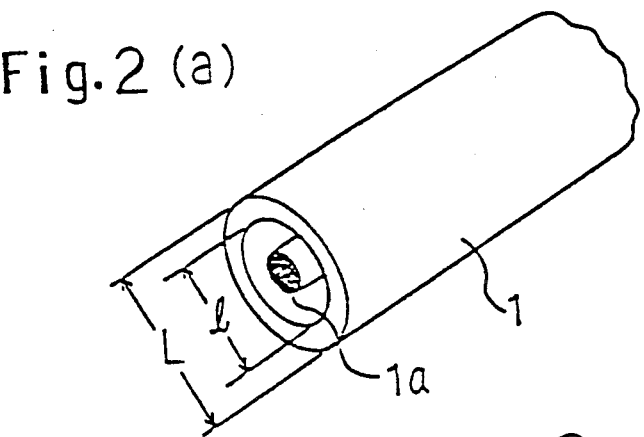
FIGS. 2 (a) to 2 (h) are another illustrative drawings which are similar to FIGS. 1 (a) to 1 (j), but in the FIG. 2, a core body is used for producing an elongated hollow article.
Figure 2:
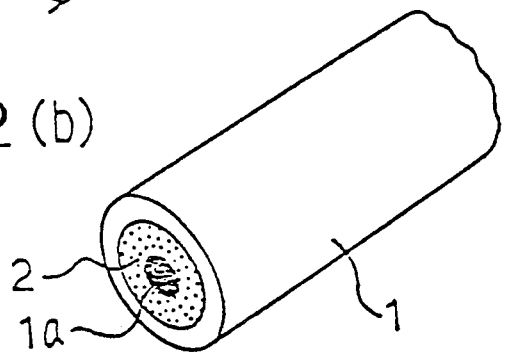
Figure 2:
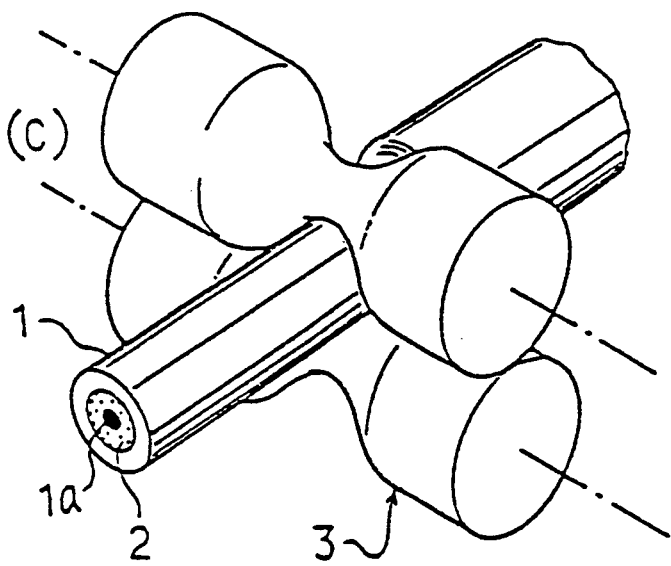
Figure 2D:
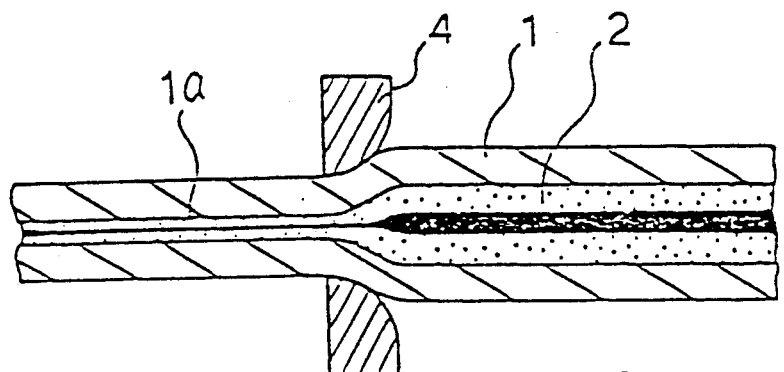
Figure 2E:
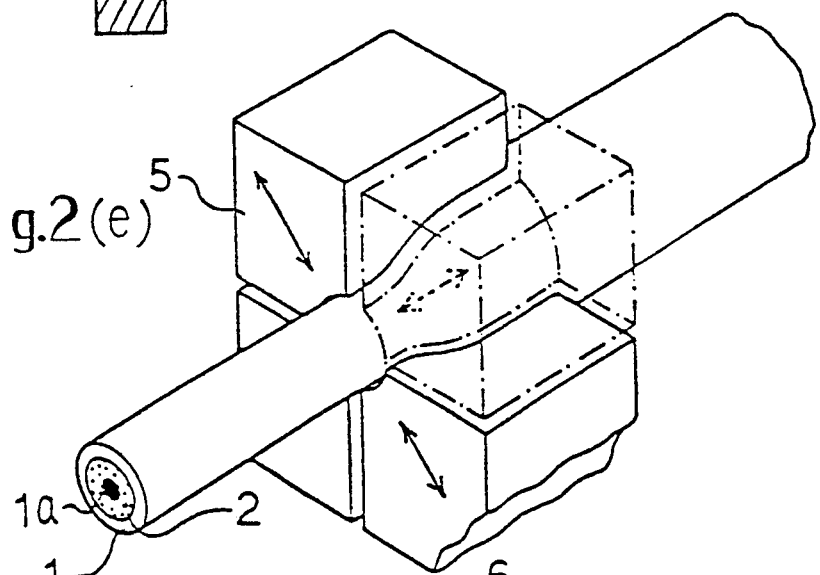
Figure 2F:
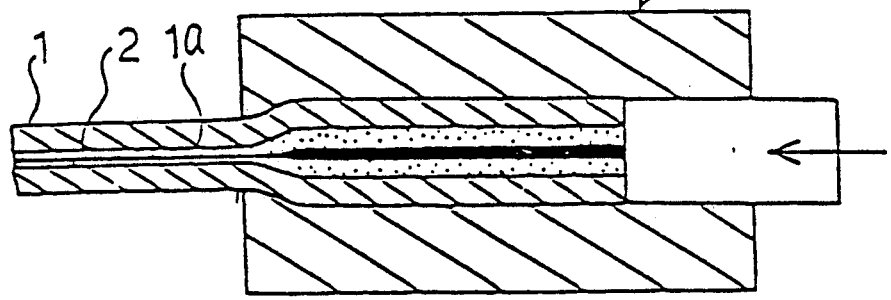
Figures 2G, 2H:
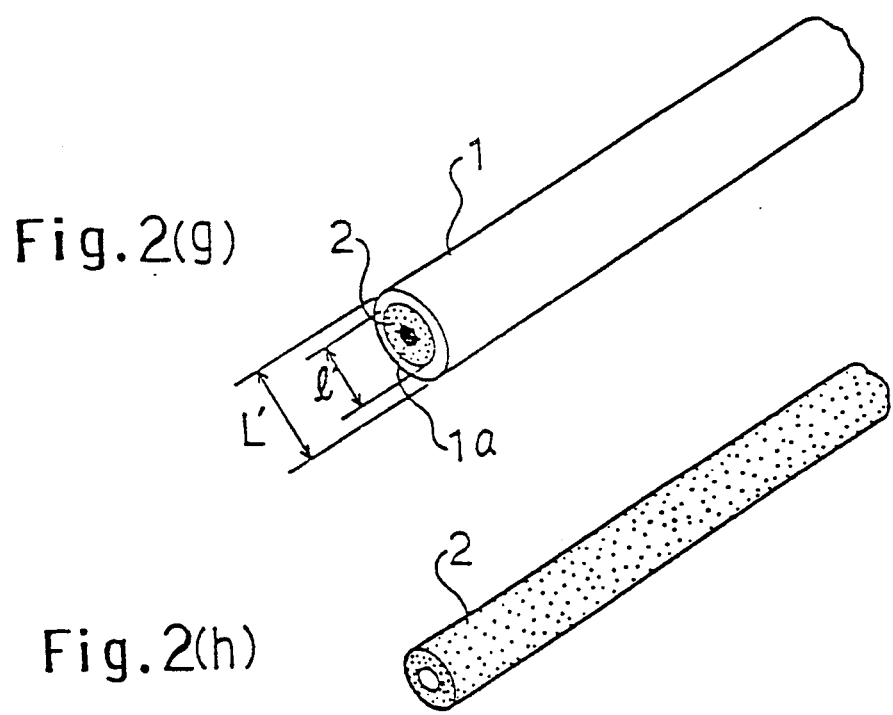

Now we will refer to FIG. 2 which illustrates another embodiment of the present invention for producing an elongated hollow sintered article. In FIG. 2, the same parts or material have the same reference numbers as FIG. 1.

In this embodiment, a core body or core member 1a is used for producing a hollow wire or rod. Namely, an elongated core body 1a is placed inside the pipe 1 (FIG. 2 (a)) and then powder material 2 is filled in an annular space between the pipe 1 and the core body 1a. Then, wire-drawing is performed by the same techniques as are shown in FIG. 1, that is by roller die 3 (FIG. 2 (c)), by a series of die plates 4 (FIG. 2 (d)), by swagging rollers 5 (FIG. 2 (e)), and by an extruder 6 (FIG. 2 (f)). The pipe 1 is reduced in diameter by abovementioned wire-drawing operation as is shown in FIG. 2 (g) wherein the core body 1a has a reduced diameter 1' while the pipe 1 has a reduced diameter L'. Under this condition, the composite of the core 1a, powder material 2 and the outer pipe 1 is subjected to preliminary sintering during which the core body 1a may be burnt if the core 1a is made of combustible material.

As is the FIG. 1, in this embodiment also, it is possible to remove the counter layer 1 off the inner body 2 which is then sintered to produce a hollow sintered article as is shown in FIG. 2 (h).

It is apparent from the description abovementioned that the method for producing an elongated article of sintered powder according to the present invention is completely different from conventional process in which binder of organic compounds is used. Still more, in the present invention, a long wire or rod having a higher value of dimension ratio of longitudinal dimension to transversal dimensional can be produced continuously if the powder material is fed continuously during the pipe is manufactured or shaped from a flat sheet. Furthermore, since the powder material is filled in and supported in the pipe during the plastic deformation stage, the powder material can take any form such as a coil.

Now, we will describe the present invention for producing an elongated sintered articles which are produced with a variety of powder materials with referring the following Examples.

EXAMPLE 1

The First Embodiment

In a pipe made of pure nickel having an outer diameter of 12.0 mm and a wall thickness of 3 mm, the following two kinds of powder materials (a) and (b) were filled:

(a) WC containing 2 wt % of Co
(b) $Al_2O_3$ containing 29.5 wt % of TiC, 2.0 wt % of $TiO_2$, 0.1 wt % of MgO, 0.1 wt % of $Cr_2O_3$ and 1.5 wt % of NiO The first pipe filled with the powder material (a) was wire-drawn by a hot-swagging unit at 700° C. to reduce its outer diameter to 10.0 mm (this pipe is called Sample 1a hereinafter).

The second pipe filled with the powder material (b) was wire-draw as the same manner as above (this pipe is called Sample 1b).

The third and fourth pipes filled with the powder materials (a) and (b) respectively were wire-drawn by a hot-swagging unit at 1250° C. which is above sintering temperatures of the powder materials (a) and (b) to reduce their outer diameter to 10.0 mm (there pipes are called Sample 2a and 2b respectively).

The fifth and sixth pipes filled with the powder materials (a) and (b) respectively were wire-drawn by a pair of dies in place of by the hot-swagging unit to reduce its outer diameter to 10.0 mm (these pipes are called Samples 3a and 3b respectively).

All of the Samples were then wire-drawn by a pair of dies to reduce their outer diameters to 8.5 mm. The result showed that Samples 1a, 1b, 3a and 3b could be wire-drawn without damage, while Samples 2a broke at the first die and Sample 2b broke at the second die. These breakage occurred not at the outer metal pipe but at the inner powder due to shear-stress.

Samples 1a, 1b, 3a and 3b were annealed at 600° C. for 20 min. and then were wire-drawn through a die to reduce their outer diameter to 6.0 mm with no breakage. The resulting pipes having the outer diameter of 6.0 mm of Samples 1a, 1b, 3a and 3b were then sintered at 1300° C. for 1 hr. and then their outer pipes of pure nickel were removed by washing them with nitric acid. Samples 1a and 1b were further sintered at 1800° C. for 1 hr.

The resulting wires obtained from Samples 1a, 1b, 3a, and 3b showed the following Vickers hardness (under a load of 50 Kg):

| Sample 1a | 1520 |
| Sample 1b | 1910 |
| Sample 3a | 1470 |
| Sample 3b | 1820 |

These values of hardness reveal such fact that these samples have good properties as abrasion-resistant products.

In the other experiments in which Samples 1a, 1b, 3a and 3b were annealed at 1250° C. for 20 min. in place of abovementioned 600° C. for 20 min., the resulting pipes broke at the first die when their outer diameter was reduced to 8.0 mm.

EXAMPLE 2

The Second Embodiment 75 wt % of commercially available WC powder having an average particle size of 0.8 microns, 5 wt % of commercially available WC powder and 20 wt % of commercially available Co powder were mixed in wet in an attriter and dried. After passing through a 100 mesh sieve, the resulting powder was filled in a pipe made of copper tube having an outer diameter of 6 mm, an inner diameter of 5 mm and a length of 300 mm and opposite ends of the tube was sealed.

The tube filled with the powder material was wire-drawn to reduce its outer diameter to 2 mm and then preliminary sintering was carried out at 950° C. for 30 min. under vacuum. Then, the copper outer tube was removed by cutting operation. The resulting preliminary sintered body was sintered at 1325° C. under vacuum to obtain a rod of cemented carbide having a diameter of 1.44 mm and a length of 228 mm.

The rod was then reduced on its outer periphery by cutting operation to gain an outer diameter of 1.4 mm and then the deflective strength was measured by the three-point bending breakage test. The result showed 495 Kg/mm² of the deflective strength.

In a comparative example, a rod of the same size was produced with the same proportion of powder materials and by the same procedure as abovementioned Example 2 except that a conventional binder of organic compound was added to the powder material which was then extruded and sintered the result showed the deflective strength of 295 Kg/mm². In this comparative example, it was necessary to mix 45 volume % of paraffin as a binder with the powder material to facilitate extrusion process.

In the other experiments wherein a rectangular billet having a cross section of 3.0×3.0 mm and a length of 40 mm was prepared by a press and was shaped into a rod having a diameter of 1.5 mm and a length of 35 mm by cutting operation. The rod was then sintered and tested in the same manner as abovementioned. The result showed the deflective strength of 285 Kg/mm². In this technique, it was impossible to produce a longer rod of more than 50 mm long measured at the sintered final product.

EXAMPLE 3

The Second Embodiment

The same powder material as Example 2 was filled in two copper tube each having an outer diameter of 5 mm, an inner diameter of 4 mm and a length of 800 mm. After the tubes were sealed, wire-drawing was carried out for the tubes at a dimensional reduction ratio of 7% and 15% respectively, and then the tubes were subjected to preliminary sintering under the same condition as Example 2.

In the case of dimensional reduction ration of 7%, powder was not sintered sufficiently and slipped out of the tube in a form of course powder. Complete sintering was done in the case of dimensional reduction ratio of 15% and a sintered body could be removed out of the tube due to shrinkage of the sintered powder so that it was not necessary to use additional operation for removing the outer tube such as cutting or washing with acidic liquid.

The resulting preliminary sintered body was then sintered under the same condition as Example 2 to produce a rod of cemented carbide having a diameter of 2.9 mm and a length of 700 mm.

EXAMPLE 4

The Second Embodiment

The same powder material as Example 2 was filled in three nickel tubes each having an outer diameter of 6 mm, an inner diameter of 5 mm and a length of 500 mm. Wire-drawing was carried out for the tubes at a dimensional reduction ratio of 95%, 80% and 50% respectively, and then the tubes were subjected to preliminary sintering and final sintering under the same condition as Example 2 to produce rods of cemented carbide. The result showed that the rod of dimensional reduction ratio of 95% broke into three parts while other two rods did not break.

Then, the rod of dimensional reduction ratio of 80% was subjected to preliminary sintering at 600° C., 1000° C. and 1400° C. respectively and then the outer tube was removed with nitric acid. The result showed that the first rod which was sintered at 600° C. could not maintain its shape and broke into smaller pieces, the second rod which was sintered at 1400° C. broke into 6 pieces, while the third rod which was sintered at 1000° C. did not break.

EXAMPLE 5

The Third Embodiment

In a pipe made of pure nickel having an outer diameter of 12.0 mm and a wall thickness of 3 mm, a powder of WC containing 5 wt % of Co was charged. This pipe filled with the powder material was wire-drawn by a hot-stage at 700° C. to reduce its outer diameter to 10.0 mm. Then, the resulting wire-drawn pipe was annealed at 700° C. for 30 min. and then was passed through six dies so that the outer diameter of the pipe was reduced to 6.0 mm. This reduced pipe was then sintered at 1300° C. for 1 hr.

The resulting composite which was difficult of machining was an elongated wire consisting of a core of sintered alloy and a uniform surface metal layer of nickel having a thickness of 1.8 mm. This wire showed the Young' modulus of 27,500 Kg/mm² and the tensile strength of 285 Kg/mm². For a comparative example, the same powder material as abovementioned was charged in the same nickel pipe as above Example 5, but the pipe was passed through the hot-stage at 1800° C. which is a sintering temperature of the powder. In this case, the pipe could not be processed or deformed because of breakage of inner sintered powder body. Another sample of a composite pipe which was prepared in the same manner as the abovementioned Example 5 was annealed at 1300° C. for 1 hr. after the pipe was passed through the hotstage at 700° C. We tried to perform wire-drawing on this sample by a die to reduce its cross section at 20%, but it was impossible to draw the composite because of breakage thereof.

EXAMPLE 6

The Fourth Embodiment 95 wt % of commercially available $Si_3N_4$ powder having an average particle size of 0.8 microns and 5 wt % of commercially available MgO powder were mixed in wet condition in an attriter and dried. After passing through a 100 mesh sieve, the resulting powder was filled in a tube made of nickel having an outer diameter of 10 mm, an inner diameter of 8 mm and a length of 150 mm and opposite ends of the tube were sealed.

The tube filled with the powder material was subjected to wire-drawing operation to reduce its outer diameter to 4 mm and then preliminary sintering was carried out at 1200° C. for 1 hour under vacuum. After the preliminary sintering operation, the outer tube of nickel was removed by cutting operation. The resulting preliminarily sintered body maintained its shape completely. The resulting preliminarily sintered body was then finally sintered at 1750° C. under the pressure of 2 atm. to obtain a rod of $Si_3N_4$ having a diameter of 2.54 mm and a length of 700 mm. Outer periphery of the resulting rod was then reduced by cutting operation to gain an outer diameter of 2.5 mm and then the deflective strength was measured by the three-points bending test between a span of 20 mm. The resulting deflective strength was 73 $Kg/mm^2$.

In a comparative example, a rod having the same shape as abovementioned was produced with the same proportion of powder materials and by the same procedure as abovementioned Example 6 except that a known binder of organic compound was added to the powder material. In this case, the resulting deflective strength was mere 36 $Kg/mm^2$ and it was necessary to add 45 volume % of organic compound as a binder to the powder material of ceramics in order to perform extrusion technique.

EXAMPLE 7

The Fourth Embodiment 94 wt % of commercially availabler $Al_2O_3$ powder having an average particle size of 0.5 microns, 4 wt % of commercially available $SiO_2$ powder and 2 wt % of commercially available MgO powder were mixed in wet condition in an attriter and dried.

After passing through a 100 mesh sieve, the resulting powder was filled in a tube made of nickel having an outer diameter of 6 mm, an inner diameter of 5 mm and a length of 300 mm. The tube filled with the powder material was subjected to wire-drawing operation to reduce its oute diameter with the dimensional reduction ratio of 95%, 80% and 50% respectively and then preliminary sintering was carried out at 1000° C. for 1 hour under vacuum. After the preliminary sintering operation, the outer tube of nickel was removed by cutting operation. The resulting preliminarily sintered body was then sintered finally at 1800° C. under vacuum. The result showed that the rod which was produced under the dimensional reduction ratio of 95% broke into six portions, while the others were not damaged.

Preliminary sintering was performed to rods which were produced at the dimensional reduction ratio of 80% under respective temperatures of 800° C., 1000° C. and 1400° C. After the nickel tube was removed by dissolution thereof, the result revealed that a rod which was sintered at 800° C. could not maintain its shape and a rod which was sintered at 1400° C. broke into five pieces, but a rod which was sintered at 1000° C. did not damaged at all.

EXAMPLE 8

The Fourth Embodiment 99 wt % of commercially availabler SiC powder having an average particle size of 0.5 microns, 0.5 wt % of B powder and 0.5 wt % of commercially available $SiO_2$ powder and 2 wt % of commercially available C powder were mixed in wet condition in an attriter and dried.

After passing through a 100 mesh sieve, the resulting powder was filled in a tube made of nickel having an outer diameter of 5 mm, an inner diameter of 4 mm and a length of 400 mm. The tube filled with the powder material was subjected to wire-drawing operation to reduce its oute diameter with the dimensional reduction ratio of 13% and 24% respectively and then preliminary sintering was carried out at 1300° C. for 1 hour under vacuum. After the preliminary sintering operation, the outer tube of nickel was removed by cutting operation. A rod which was produced at the dimensional reduction ratio of 13% could not maintain its shape.

Another rod which was produced at the dimensional reduction ratio of 24% and which was not damaged was then sintered at 2050° C. under argon gas atmosphere of 500 Torr. The resulting rod was an elongated rod of SiC having a diameter of 2.7 mm and a length of 380 mm.

EXAMPLE 9

The Fifth Embodiment 80 wt % of commercially available WC powder having an average particle size of 0.8 micron, 2 wt % of commercially available WC powder and 18 wt % of commercially available Co powder were mixed in a solvent of ethylalcohol in an attriter and dried. After passing through a 200 mesh sieve, the resulting powders was filled in a tube made of copper having an outer diameter of 14 mm, an inner diameter of 12 mm and a length of 300 mm, wherein an elongated core made of wood having an outer diameter of 1.2 mm being placed in the tube previously, and then opposite ends of the tube was sealed.

The tube filled with the powder material was wiredrawn to reduce its outer diameter to 9 mm and then preliminary sintering was carried out at 900° C. for 30 min. under vacuum. After the preliminary sintering operation, the copper outer tube can be pealed off without difficulty because of shrinkage of the sintered inner cemented carbide. The wood core also could be removed easily because of the core is dehydrated and shrank. The resulting preliminarily sintered body was sintered at 1325° C. for 1 hour under vacuum to obtain a rod of cemented carbide having a diameter of 6.2 mm and an inner diameter of 0.9 mm.

In a comparative example, a rod having the same shape as abovementioned was produced with the same proportion of powder materials and by the same procedure as abovementioned Example 9 except that a known binder of organic compound was added to the powder material. In this case, it was necessary to add 55 volume % of organic compound as a binder to the powder material and was necessary to perform preliminary sintering at 450° C. for 48 hours under 25 Torr in hydrogen gas stream to eliminate the binder.

Outer periphery of the rods of Example 9 and comparative example was then reduced by cutting operation to gain a rod having an outer diameter of 6 mm and then the deflective strength was measured by the four-point bending test. The result deflective strength of Example 9 was 385 $Kg/mm^2$, while that of the comparative Example was mere 165 $Kg/mm^2$.

EXAMPLE 10

THE FIFTH EMBODIMENT

The same powder material as Example 9 was filled in to copper tube each having an outer diameter of 15 mm, an inner diameter of 12 mm and a length of 800 mm, a fine core of wood having a diameter of 2.0 mm being placed in the center of the tube previously. Then, wire-drawing was carried out for the tubes at a dimensional reduction ratio of 7% and 15% respectively, and then the tubes were subjected to preliminary sintering under the same condition as Example 9.

In the case of dimensional reduction ratio of 7%, powder was not sintered sufficiently and slipped out of the tube in a form of course powder. Complete sintering was done in the case of dimensional reduction ratio of 15% and a sintered body and the core could be removed out of the tube due to shrinkage of the sintered powder.

EXAMPLE 11

THE FIFTH EMBODIMENT

The same powder material as Example 9 was filled in three nickel tube each having an outer diameter of 20 mm, an inner diameter of 18 mm and a length of 500 mm, a fine core of wood having a diameter of 1.5 mm being placed in the center of the tube previously. Then, wire-drawing was carried out for the tubes at a dimensional reduction ratio of 95%, 80% and 50% respectively, and then the tubes were subjected to preliminary sintering and the final sintering under the same condition as Example 9 to produce rods of cemented carbide. The result showed that the rod of dimensional reduction ratio of 95% broke into three parts while other two rods did not break.

Then, the rod of dimensional reduction ratio of 80% was subjected to preliminary sintering at 400° C., 100° C. and 1400° C. respectively and then the outer tube was removed with nitric acid. The result showed that the first rod which was sintered at 400° C. could not maintain its shape and broke into smaller pieces, the second rod which was sintered at 1400° C. broke into 6 pieces, while the third rod which was sintered at 1000° C. did not break.

EXAMPLE 12

THE SIXTH EMBODIMENT 29.5 wt % of Cr powder, 3.9 wt % of W powder, 1.1 wt % of C powder and the balance of Co powder (all the powders were commercially available ones and were passed through a sieve of 150 mesh) were mixed and then filled in a tube made of copper having an outer diameter of 20 mm, an inner diameter of 17 mm and a length of 600 mm and then opposite ends of the tube was closed.

The tube filled with the powder material was then subjected to several times of wire-drawing operations. At each operation of wire-drawing, the tube was reduced with the dimensional reduction ratio of 70% and annealed at 500° C. before entering next wire-drawing operation. Finally, the tube had an outer diameter of 1.9 mm and an inner diameter of 1.6 mm and then preliminary sintering was carried out at 950° C. for 1 hour.

At the end of the preliminary sintering operation, the copper outer tube was removed and the inner preliminarily sintered body was then sintered finally at 1250° C. to obtain a fine wire of carbide precipitating type cobalt alloy having a diameter of 1.6 mm and a length of 67 mm. This fine wire was used as an electrode in an automatic welding machine and showed good result.

EXAMPLE 13

THE SIXTH EMBODIMENT

The same powder material as Example 12 was filled in a copper tube having an outer diameter of 50 mm, an inner diameter of 6 mm and a length of 500 mm and opposite ends were sealed.

The tube filled with the powder material was then subjected to wire-drawing at the dimensional reduction ration of 95%, 90%, 85%, 25%, 20% and 15% respectively and then the tubes were subjected to preliminary sintering at 95° C. for 1 hour. When the outer copper sheaths were removed by cutting process, it was found that the first one of the preliminarily sintered bodies whose dimensional reduction ratio was 95% broke and the last one whose dimensional reduction ratio was 15% cracked, while the others were not damaged.

Then, the preliminarily sintered body whose dimensional reduction ratio was 85% was subjected to the final sintering operation at temperatures of 10° C., 30° C., 100° C. and 150° C. lower than the melting point of the alloy respectively. The result showed that the first rod which was sintered at the difference in temperature of 10° C. did not maintain its shape because of lack of strength and the fourth one which was sintered at the difference in temperature of 150° C. could not be sintered completely, while the others were sintered satisfactorily.

EXAMPLE 14 (THE SEVENTH EMBODIMENT)

28.4 wt % of Cr powder, 4.1 wt % of W powder, 1.1 wt % of C powder and the balance of Co powder (all the powders were commercially available ones and were passed through a sieve of 150 mesh) were mixed and then filled in a tube made of iron having an outer diameter of 7 mm, an inner diameter of 5 mm and a length of 600 mm and then opposite ends of the tube was closed.

The iron tube filled with the powder material was wire-drawn at the dimensional reduction ratio of 90% to obtain a wire having an outer diameter of 2.2 mm, an inner diameter of 1.6 mm and a length of 6 m. Then, the powder material in the tube was sintered at 1240° C. for 1 hour and then iron sheath was removed by dipping the tube in hydrochrolic acid to obtain a fine wire of carbide precipitating reinforced type cobalt-based alloy.

The resulting fine wire of carbide precipitating reinforced type cobalt-based alloy having a diameter of 1.6 mm and a length of 60 mm was used as an electrode in an automatic welding machine and good quality of welding was observed.

EXAMPLE 15 (THE SEVENTH EMBODIMENT)

30.5 wt % of Cr powder, 17.1 wt % of W powder, 2.1 wt % of C powder and the balance of Co powder (all the powders were commercially available ones and were passed through a sieve of 150 mesh) were mixed and then filled in a tube made of nickel having an outer diameter of 8 mm, an inner diameter of 6 mm and a length of 500 mm and then opposite ends of the tube was closed.

The nickel tube filled with the powder material was then subjected to wire-drawing at the dimensional reduction ration of 95%, 90%, 85%, 25%, 20% and 15% respectively and then the tubes were subjected to sintering at 1200° C. for 1 hour. When the outer nickel sheaths were removed by cutting process, it was found that the first one of the sintered bodies whose dimensional reduction ratio was 95% broke and the last one whose dimensional reduction ratio was 15% cracked, while the others were not damaged.

Then, the sintered body whose dimensional reduction ratio was 85% was subjected to the final sintering operation at temperatures of 10° C., 30° C., 100° C. and 150° C. lower than the melting point of the alloy respectively. When the nickel sheath was removed, the result showed that the first rod which was sintered at the difference in temperature of 10° C. showed diffusion of nickel which reacted with a surface of the sintered body and the fourth one which was sintered at the difference in temperature of 150° C. could not be sintered completely, while the others were sintered satisfactorily.

EXAMPLE 16 (THE SEVENTH EMBODIMENT)

53.5 wt % of Cr powder, 7.2 wt % of W powder, 1.7 wt % of C powder and the balance of Co powder (all the powders were commercially available ones and were passed through a sieve of 150 mesh) were mixed and then filled in a tube made of cobalt having an outer diameter of 5 mm, an inner diameter of 4 mm and a length of 600 mm and then opposite ends of the tube was closed.

The nickel tube filled with the powder material was then subjected to wire-drawing at the dimensional reduction ration of 90% to obtain an elongated wire having an outer diameter of 1.6 mm, an inner diameter of 1.3 mm and a length of 6 m and then the tube was subjected to sintering at 1250° C. for 1 hour to obtain a wire of Co based alloy.

The wire of the Co based alloy having a diameter of 1.6 mm and a length of 6 mm has a surface layer of cobalt of 0.15 mm thick. The wire has as a whole such a composition as 28.2 wt % of Co—3.8 wt % of Cr—0.9 wt % of C. This wire was used as an electrode for an automatic welding machine with good result.

We claim:

1. Method for producing an elongated sintered article, comprising the steps of filling powder material in a pipe, said powder material being ceramic, elongating said pipe filled with the powder material, to perform plastic deformation, and heating the elongated pipe filled with the powder material to burn and/or sinter the powder material.

2. Method for producing an elongated sintered article according to claim 1, wherein the pipe is made of metal.

3. Method for producing an elongated sintered article according to claim 2, wherein the metal is at least one of metals selected from a group consisting of Fe, Cu, Ni, Co and Al, alloys containing these metals and stainless steel.

4. Method for producing an elongated sintered article according to claim 1, wherein the powder material does not contain binder.

5. Method for producing an elongated sintered article according to claim 1, wherein the powder material is pelletized before the powder material is filled in the pipe.

6. Method for producing an elongated sintered article according to claim 1, wherein at least one of ends of the pipe is sealed before the step of plastic deformation of the pipe filled with the powder material and before the step of burning and/or sintering.

7. Method for producing an elongated sintered article according to claim 1, wherein the plastic deformation is performed by wire-drawing or rolling.

8. Method for producing an elongated sintered article according to claim 7, wherein the wire-drawing is carried out by means of die, roller die, roller, swagging unit or extruder.

9. Method for producing an elongated sintered article according to claim 7, wherein a plural times of plastic deformation are carried out in the plastic deformation stage.

10. Method for producing an elongated sintered article according to claim 9, wherein different kinds of plastic deformation processes are used in the plastic deformation stage.

11. Method for producing an elongated sintered article according to claim 7, wherein the plastic deformation is carried out under heating conditions.

12. Method for producing an elongated sintered article according to claim 11, wherein the plastic deformation is carried out at a temperature which is not higher than the burning temperature or sintering temperature of the powder material.

13. Method for producing an elongated sintered article according to claim 8, wherein, in the plastic deformation stage, the pipe filled with the powder material is heated at a temperature which is higher than the anneal temperature or tempering temperature.

14. Method for producing an elongated sintered article according to claim 1, wherein the pipe filled with the powder material is annealed or tempered before or at the same time as the plastic deformation.

15. Method for producing an elongated sintered article according to claim 14, wherein the annealing or tempering is carried out at the burning temperature or sintering temperature of the powder material.

16. Method for producing an elongated sintered article according to claim 15, wherein the annealing or tempering is performed at a temperature which is from 10° to 100° C. lower than the burning temperature or sintering temperature of the powder material.

17. Method for producing an elongated sintered article according to claim 1, wherein the step of the burning or sintering is burning-treatment of the powder material.

18. Method for producing an elongated sintered article according to claim 15, wherein the burning-treatment is carried out at a temperature which is from 10° to 100° C. lower than the melting temperature of the powder material.

19. Method for producing an elongated sintered article according to claim 1, wherein the step of burning or sintering is sintering-treatment of the powder material.

20. Method for producing an elongated sintered article according to claim 19, wherein the sintering-treatment is carried out at a temperature which is from 10° to 100° C. lower than the melting temperature of the powder material.

21. Method for producing an elongated sintered article according to claim 1, wherein an elongated core body extending through the pipe is placed in the pipe together with the powder material.

22. Method for producing an elongated sintered article according to claim 21, wherein the elongated core body is removed after the plastic deformation step or the burning and/or sintering step.

23. Method for producing an elongated sintered article according to claim 21, wherein the elongated core body is made of wood.

24. Method for producing an elongated sintered article according to claim 1, wherein at least a part of the plastic deformation step and at least a part of the burning and/or sintering step are carried out simultaneously.

25. Method for producing an elongated sintered article according to claim 1, wherein the burning and/or sintering stage is carried out after the plastic deformation stage.

26. Method for producing an elongated sintered article according to claim 1, wherein the pipe remains as an outer layer on the final product.

27. Method for producing an elongated sintered article according to claim 1, wherein the longitudinal dimension of the final product is more than 100 times longer than the cross sectional dimension thereof.

28. Method for producing an elongated sintered article, comprising the steps of filling powder material in a pipe, said powder material being ceramic, elongating said pipe filled with the powder material to perform plastic deformation, the pipe being a single layer and including metal, the elongation being carried out with the single layer pipe around the powder material at a temperature which is higher than an annealing temperature of the metal in the pipe but is lower than the sintering temperature of the powder, and heating the pipe filled with the powder material to burn and/or sinter the powder material.

* * * * *